US007917736B1

(12) United States Patent
French et al.

(10) Patent No.: US 7,917,736 B1
(45) Date of Patent: Mar. 29, 2011

(54) LATENCY TOLERANT PIPELINE SYNCHRONIZATION

(75) Inventors: Mark J. French, Raleigh, NC (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/614,236

(22) Filed: Nov. 6, 2009

Related U.S. Application Data (62) Division of application No. 11/554,511, filed on Oct. 30, 2006, now Pat. No. 7,620,798.

(51) Int. Cl.
*G06F 9/38* (2006.01)
(52) U.S. Cl. ..................................................... 712/216
(58) Field of Classification Search .................. 712/200, 712/216, 228
See application file for complete search history.

(56) References Cited

U.S. PATENT DOCUMENTS 5,428,756 A * 6/1995 Edamatsu et al. ............ 712/220
7,676,588 B2 * 3/2010 Georgiou et al. ............. 709/230

* cited by examiner

*Primary Examiner* — William M Treat
(74) *Attorney, Agent, or Firm* — Patterson & Sheridan, LLP (57) ABSTRACT

A synchronization mechanism is used to synchronize events across multiple execution pipelines that process transaction streams. A common set of state configuration is included in each transaction stream to control processing of data that is distributed between the different transaction streams. Portions of the state configuration correspond to portions of the data. Execution of the transaction streams is synchronized to ensure that each portion of the data is processed using the state configuration that corresponds to that portion of the data. The synchronization mechanism may be used for multiple synchronizations and when the synchronization signals are pipelined to meet chip-level timing requirements.

15 Claims, 5 Drawing Sheets

Figure 4 ns TOLERANT PIPELINE
SYNCHRONIZATION

CROSS-REFERENCE TO RELATED APPLICATIONS

This application is a divisional of U.S. patent application Ser. No. 11/554,511, filed Oct. 30, 2006 now U.S. Pat. No. 7,620,798, which is hereby incorporated herein by reference.

BACKGROUND OF THE INVENTION

1. Field of the Invention

One or more aspects of the present invention relate generally to synchronizing events across multiple execution pipelines, and more particularly to synchronizing the events using signals that may incur varying amounts of latency.

2. Description of the Related Art

Multiple execution pipelines are conventionally used to increase processing throughput. Sometimes it is necessary to synchronize the multiple pipelines in order to process data from a common starting point. Some conventional synchronization mechanisms require that each of the multiple pipelines signal their execution status to each other or a central synchronization unit in a single clock cycle. As chip die sizes increase, the distance that the signals must travel across a die may increase beyond what can be accomplished in a single clock cycle and in order to meet the chip-level timing constraints, the signals are pipelined. Pipelining the signals may result in varying latencies for each signal complicating synchronization when multiple synchronization events occur in sequence.

When the signals are pipelined, a conventional handshake synchronization mechanism is used so that each sender of a signal is acknowledged by the central synchronization unit or every other execution pipeline. Unfortunately, the round trip latency incurred for the handshaking synchronization of each synchronization event reduces the processing throughput of the multiple execution pipelines.

As the foregoing illustrates, what is needed in the art is the ability to synchronize multiple execution pipelines when multiple synchronization events may occur in sequence and the synchronization signals are pipelined to meet chip-level timing constraints.

SUMMARY OF THE INVENTION

Systems and methods of the present invention are used to synchronize events across multiple execution pipelines that process transaction streams. The current invention provides the ability to synchronize multiple execution pipelines when multiple synchronization events may occur in sequence and when the synchronization signals are pipelined to meet chip-level timing constraints.

Each transaction stream that is executed by one of the multiple execution pipelines includes a common set of state configuration to control processing of data that is distributed between the different transaction streams. Portions of the state configuration correspond to portions of the data. Execution of the state configuration portions of the transaction streams is synchronized to ensure that each portion of the data is processed using the state configuration that corresponds to that portion of the data. In some cases, such as when a transaction sequence does not include a portion of data corresponding to a particular portion of state configuration, different portions of the state configuration may occur back-to-back, resulting in back-to-back synchronization events. The synchronization mechanism tolerates latency for the transmission of synchronization signals between the multiple execution pipelines to allow for pipelining of the signals and back-to-back synchronization events.

Various embodiments of a method of the invention for synchronizing execution of multiple transaction streams including a first transaction stream and remaining transaction streams includes receiving a synchronization transaction included in the first transaction stream, outputting a synchronization strobe to each processing pipeline executing one of the remaining transaction streams indicating that a synchronization point of the multiple transaction streams has been reached, maintaining independent synchronization state within each processing pipeline for each one of the multiple transaction streams, determining whether each one of the remaining transaction streams have reached the synchronization point using the synchronization state for each one of the multiple transaction streams, and disabling output of the first transaction stream when one or more of the multiple transaction streams have not reached the synchronization point.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
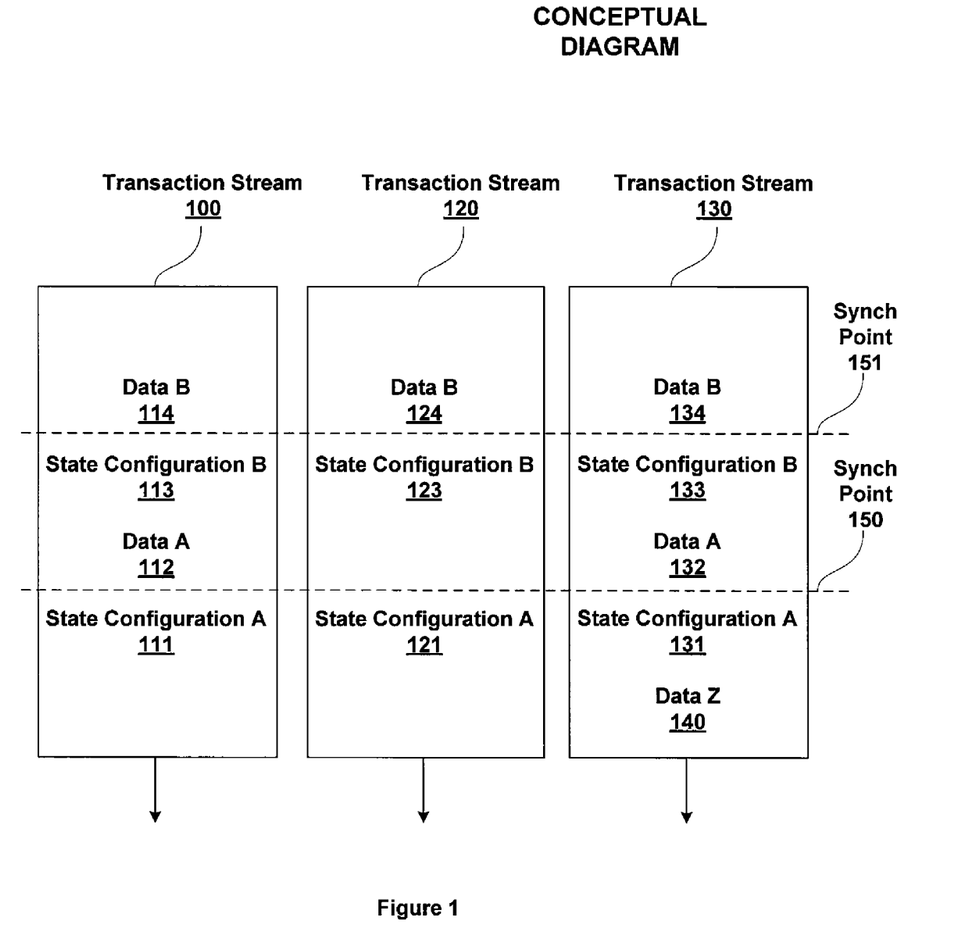
FIG. 1 is a conceptual diagram illustrating transaction streams that include synchronization points for execution by different pipelines in accordance with one or more aspects of the present invention.

FIG. 1 is a conceptual diagram illustrating transaction streams 100, 120, and 130 for execution by different execution pipelines, in accordance with one or more aspects of the present invention. Each transaction stream 100, 120, and 130 includes synchronization (synch) points 150 and 151. Synchronization points 150 and 151 may be embedded in the portions of state configuration corresponding to each portion of data for processing by the multiple execution pipelines. In other embodiments of the present invention, synchronization points are specified as discrete instructions in each transaction stream 100, 120, and 130. Synchronization points may be needed for a variety of purposes. For example, synchronization may be needed to guarantee consistent state when transaction streams 100, 120, and 130 are combined into a single transaction stream. In systems that perform context switching without requiring the different execution pipelines to idle, synchronization may be needed to guarantee that transaction streams 100, 120, and 130 have reached a haltable condition such that all data received prior to the synchronization point is resolved or reconciled prior to halting. In systems that perform two-dimensional "blits" that copy a rectangle of pixel data that overlaps itself, synchronization may be required to guarantee that source data has been read before being overwritten during the blit. Persons skilled in the art will recognize that there are a variety of reasons for which synchronization between state and data are required, and that the present invention may be employed to advantageously add synchronization points in two or more transaction streams.

State configuration A 111, state configuration A 121, and state configuration A 131 may be identical or may be tailored specifically for each transaction stream 100, 120, and 130 based on the particular execution pipeline that will process transaction stream 100, 120, and 130, respectively. Furthermore, state configuration A (represented by state configuration A 111, state configuration A 121, and state configuration A 131) and state configuration B (represented by state configuration B 113, state configuration B 123, and state configuration B 133) may include one or more configuration instructions that set up each of the multiple execution pipelines to operate in a specified mode with state information provided by the configuration instructions.

In some embodiments of the present invention, each one of the configuration instructions is considered a synchronization event. In other embodiments of the present invention, a first or last configuration instruction within a sequence of configuration instructions, e.g., state configuration A or state configuration B, is considered a synchronization event. In one embodiment, illustrated in FIG. 1, synchronization points 150 and 151 occur at the last configuration instruction of state configuration A and state configuration B, respectively. When each configuration instruction is a synchronization event, additional synchronization points are included that correspond to each configuration instruction within state configurations A and B.

Transaction streams 100, 120, and 130 each include a portion of data for processing by an execution pipeline that is configured as specified by the state configuration corresponding to each portion of the data. As shown in transaction stream 120, state configuration A 121 is back-to-back with state configuration B 123 since transaction stream 120 does not include any data for processing using the execution pipeline configuration specified by state configuration A 121. In contrast, transaction stream 100 includes data A 112 for processing as specified by state configuration A 111 and data B 114 for processing as specified by state configuration B 113. Transaction stream 130 includes data A 132 for processing as specified by state configuration A 131 and data B 134 for processing as specified by state configuration B 133.

Transaction stream 130 includes data Z 140 that is processed as specified by an earlier state configuration (not shown). When the execution pipelines receiving transaction streams 100 and 120 receive state configuration A 111 and state configuration A 121, respectively, they will wait for the execution pipeline processing data Z 140 to output data Z 140 and indicate that state configuration A 131 is at the output before outputting data A 112 and state configuration B 123, respectively. Similarly, the execution pipeline processing and outputting state configuration B 123 of transaction stream 120 will wait for the execution pipelines processing data A 112 and data A 132 to each output data A 112 and data A 132 and execute state configuration B 113 and 133 before outputting data B 124. Once all of the execution pipelines are synchronized for synchronization point 151, i.e., have output state configurations B 113, 123, and 133, they may then output data B 114, 124, and 134, respectively. In some embodiments of the present invention, all of the execution pipelines are synchronized for each synchronization point before either data or state configuration is output from any of the execution pipelines. In these embodiments, a synchronization latency is incurred for each synchronization point and when each configuration instruction is a synchronization event, synchronization latencies are incurred serially, thereby limiting transaction throughput when the latency is greater than one clock cycle.

In other embodiments of the present invention an amount of elasticity is allowed for the synchronization so that the execution pipelines are allowed to "get ahead" by outputting a limited number of state configuration transactions without waiting for the other execution pipelines to output data or even a previous state configuration. For example, the execution pipeline processing and outputting state configuration B 123 of transaction stream 120 can proceed to output a limited number of state configuration transactions of state configuration B 123 and get ahead of the other execution pipelines that may not have completed output of data A or state configuration A. Unlike the state configuration transactions, a data transaction cannot get ahead until all of the execution pipelines have output the state configuration corresponding to the data. For example, the execution pipeline processing and outputting data A 132 of transaction stream 130 must wait for the execution pipelines processing transaction streams 100 and 120 to output state configuration A 111 and 121, respectively.

Figure 2A:
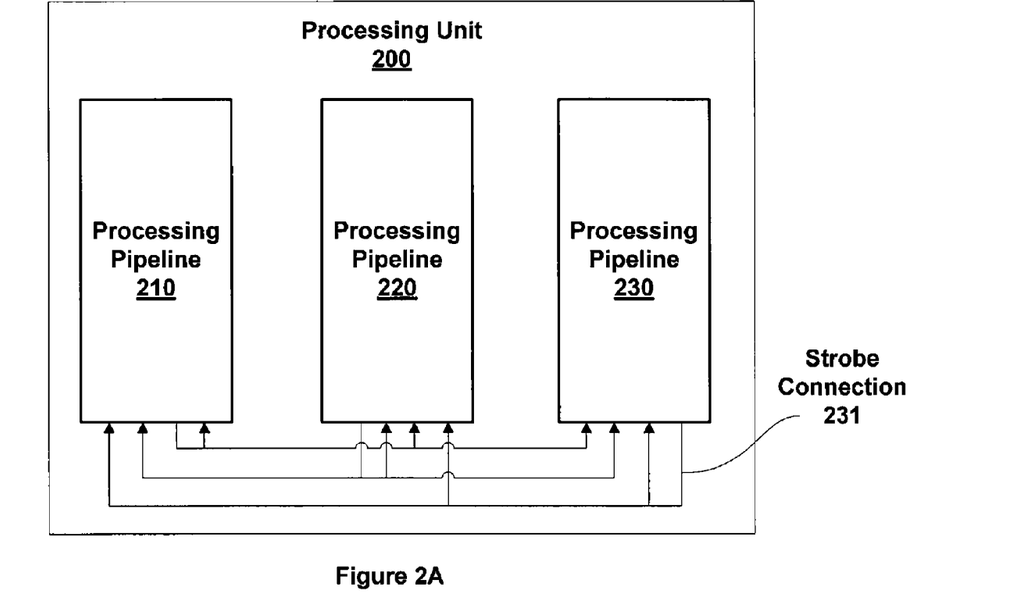
FIG. 2A is a block diagram illustrating processing pipelines that are connected for synchronization in accordance with one or more aspects of the present invention.

FIG. 2A is a block diagram illustrating a processing unit 200 that includes processing pipelines 210, 220, and 230, in accordance with one or more aspects of the present invention. Although three processing pipelines are shown in FIG. 2A, the present invention may also be employed with as few as two processing pipelines or more than three processing pipelines. Each processing pipeline 210, 220, and 230 receives an input transaction stream and output an output transaction stream (not shown). The state configuration in the input transaction streams may be modified by processing pipeline 210, 220, and 230 as the state configuration passes through processing pipelines 210, 220, and 230. The input data included in the input transaction streams is processed to produce data that is included in the output transaction stream. Data may be modified, generated, or eliminated during the processing. Processing unit 200 may also include other units such as memories, state machines, interfaces, or the like.

Each processing pipeline 210, 220, and 230 asserts a synchronization strobe for a single clock cycle when a synchronization point is reached in a transaction stream. For example, a strobe connection 231 transmits the synchronization strobe signal output by processing pipeline 230 to processing pipeline 210 and processing pipeline 220. Strobe connection 231 also transmits the synchronization strobe signal back to processing pipeline 230. In some embodiments of the present invention, strobe connection 231 is not input to processing pipeline 230. The generation and monitoring of the synchronization strobes is described in conjunction with FIGS. 3A and 3B.

Figure 2B:
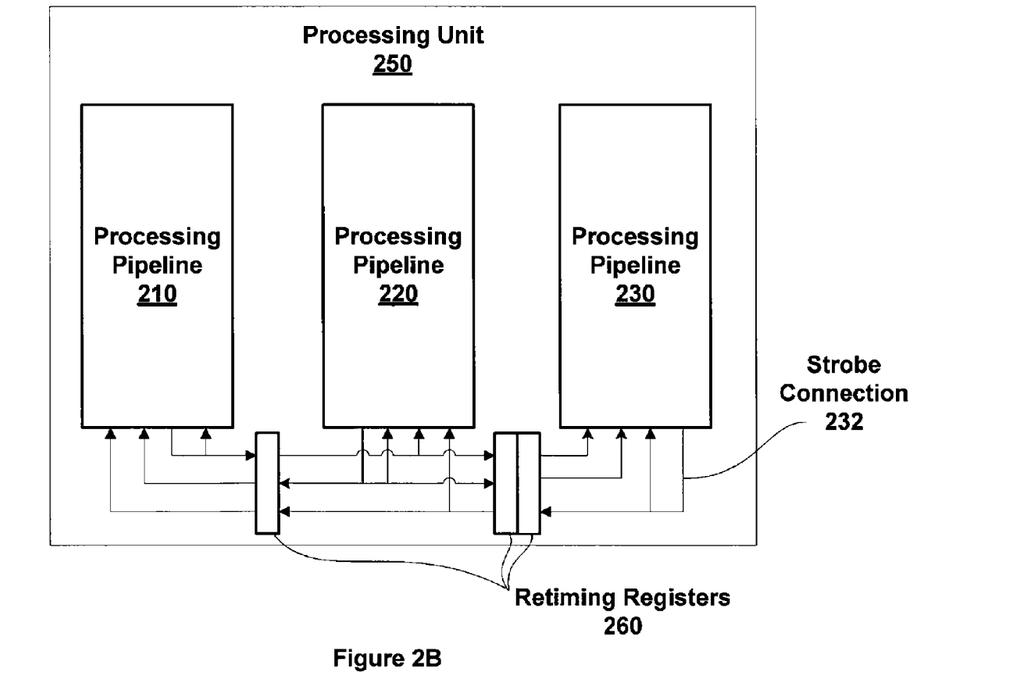
FIG. 2B is a block diagram illustrating processing pipelines that are connected for synchronization with retiming registers in accordance with one or more aspects of the present invention.

FIG. 2B is a block diagram illustrating a processing unit 250 that includes processing pipelines 210, 220, and 230, in accordance with one or more aspects of the present invention. In order to meet chip-level timing constraints for Processing unit 250, the synchronization signal connections between processing pipelines 210, 220, and 230 are pipelined using retiming registers 260. Retiming registers 260 introduce one or more additional clock cycles of latency for the synchronization strobes that pass through retiming registers 260. For example, a strobe connection 232 is used to transmit a synchronization strobe from processing pipeline 230 to a first pair of retiming registers 260 and input to processing pipeline 220. The synchronization strobe output by the first pair of retiming registers 260 is passed through another retiming register of retiming registers 260 and input to processing pipeline 210.

The synchronization mechanism of the present invention is tolerant of latency. In particular when a sequence of back-to-back synchronization events occurs, the synchronization latency, including any latency introduced by retiming registers 260 is only incurred once for processing the entire sequence rather than for each event in the sequence. In other words, once the synchronization latency is incurred state configuration instructions are output at a rate of one per clock. Data that follows the state configuration may then be output at a rate of one per clock until another synchronization event is encountered.

When each state configuration transaction is also a synchronization transaction, the different processing pipelines 210, 220, and 230 are allowed to output the state configuration without synchronizing each state configuration transaction. However, the number of state configuration transactions that any processing pipeline 210, 220, or 230 is permitted to advance "ahead" of the other processing pipelines is limited by a counter. This elasticity is advantageous since the latency introduced by retiming registers 260 is not incurred for each state configuration transaction when each state configuration transaction is also a synchronization transaction. Although one or more of processing pipelines 210, 220, and 230 may advance ahead, processing pipelines 210, 220, and 230 must wait for all of processing pipelines 210, 220, and 230 before beginning to output data transactions or another state configuration.

Figure 2C:
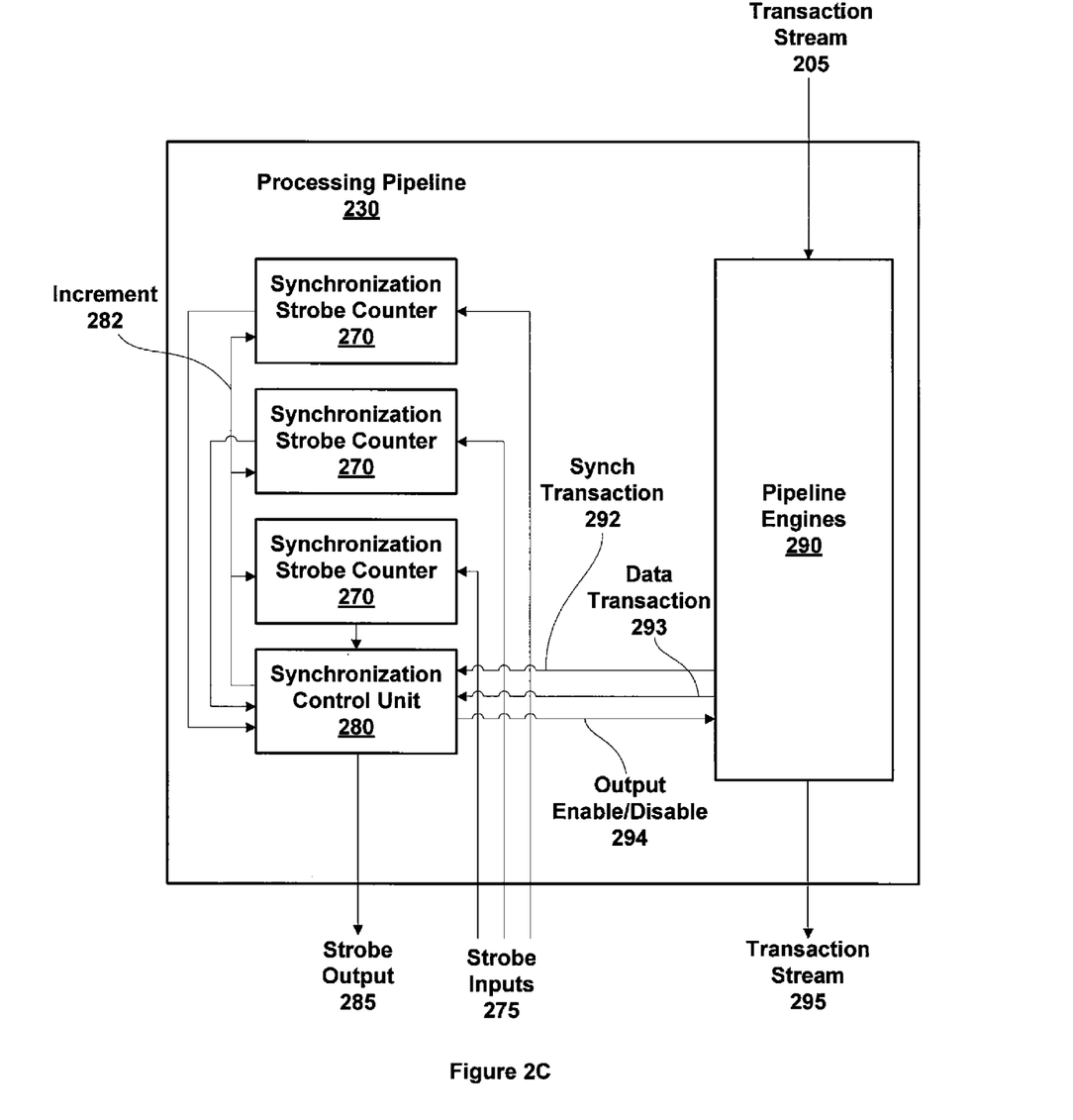
FIG. 2C is a block diagram illustrating a single processing pipeline of FIGS. 2A and 2B in accordance with one or more aspects of the present invention.

FIG. 2C is a block diagram illustrating a single processing pipeline 230 of FIGS. 2A and 2B, respectively, in accordance with one or more aspects of the present invention. A pipeline engines 290 receives an input transaction stream 205 and outputs an output transaction stream 295. Transaction stream 205 or 295 may be transaction stream 100, 120, or 130 of FIG. 1. Pipeline engines 290 includes one or more pipelined processing engines arranged in a pipeline that are configured using the state configuration included in transaction stream 205. Pipeline engines 290 process the data included in transaction stream 205 to produce data for output in transaction stream 295.

Processing pipeline 230 includes a synchronization control unit 280 for generating and receiving synchronization strobe signals. Processing pipeline 230 also includes multiple synchronization strobe counters 270 that maintain synchronization state for each transaction stream being processed by processing pipeline 210, 220, and 230. Each one of the synchronization strobe counters 270 corresponds to a particular processing pipeline 230, 210, 220, or the like. The synchronization state maintained by synchronization strobe counters 270 is used to enable and disable the output of data, state configuration, and synchronization transactions from processing pipeline 230.

Synchronization strobe counters 270 are used to determine when the processing pipelines in a system are synchronized and should be configured to count at least as high as the latency for a synchronization strobe to propagate from one processing pipeline to another processing pipeline. When a synchronization transaction reaches the output of pipeline engines 290, pipeline engines 290 signals synchronization control unit 280 via synch transaction 292. A synchronization transaction may be all state configuration instructions or a discrete synchronization instruction. Synchronization control unit 280 outputs a synchronization strobe on strobe output 285. The synchronization strobe may then propagate through one or more retiming registers before reaching another processing pipeline. When synchronization transactions occur on consecutive clock cycles, processing pipelines 210, 220, and 230 will output transactions in lockstep if the maximum count is equal to the worst-case synchronization strobe propagation latency from one processing pipeline 210, 220, and 230 to any other processing pipeline 210, 220, and 230. Therefore, it is advantageous to increase the maximum count, thereby increasing the elasticity of state configuration transaction outputs between processing pipelines 210, 220, and 230, and reducing the frequency of processing pipelines 210, 220, and 230 stalling to wait for one or more of the processing pipelines to "catch up."

One synchronization control unit 280 receives the synchronization strobe output on strobe output 285 via one of strobe inputs 275. The other synchronization control units 280 receive synchronization strobes from processing pipelines 210 and 220 via the other two strobe inputs 275. Synchronization strobe counters 270 each decrement when a strobe is received. Synchronization strobe counters 270 are simultaneously incremented using an increment 282 signal output by synchronization control unit 280 when synchronization control unit 280 outputs a synchronization strobe on strobe output 285. In other embodiments of the present invention, the incrementing and decrementing is reversed. Therefore, each synchronization strobe counter 270 indicates how far ahead (positive values) or behind (negative values) each local pipeline engine, e.g., pipeline engines 290 within processing pipeline 230, is relative to the pipeline engines in each one of processing pipelines 210, 220, and 230. When the values of synchronization strobe counters 270 are zero, processing pipelines 210, 220, and 230 are synchronized at the same synchronization event.

Synchronization control unit 280 provides an output enable/disable 294 signal to pipeline engines 290 to control whether or not transactions are output by pipeline engines 290 for transaction stream 295. Separate output enable/disable 294 signals are used to control the output of state configuration transactions and data transactions from pipeline engines 290. When the value of each synchronization strobe counter 270 does not exceed the maximum count, the state configuration transactions are output at a rate of one per clock until a non-synchronization transaction, e.g., a data transaction, is ready for output by pipeline engines 290. Therefore, the synchronization latency is only incurred once for each sequence of synchronization transactions. Data transactions are output at a rate of one per clock following synchronization, as long as the unit receiving the data transactions can accept them. When a data transaction reaches the output of pipeline engines 290, pipeline engines 290 signals synchronization control unit 280 via data transaction 293.

Figure 3A:
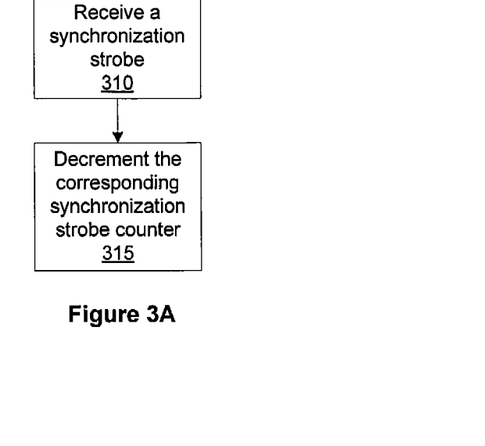
FIG. 3A illustrates a method for processing a synchronization strobe signal in accordance with one or more aspects of the present invention.

FIG. 3A illustrates a method for processing a synchronization strobe signal, in accordance with one or more aspects of the present invention. In step 310 a synchronization strobe signal is received by processing pipeline 230. Note that during any single clock cycle, as many as three synchronization strobe signals may be received by processing pipeline 230 since strobe inputs 275 includes a connection for each of three processing pipelines 210, 220, and 230.

In step 315 the particular synchronization strobe counter 270 that corresponds to the synchronization strobe signal received in step 310 is decremented to indicate that a synchronization transaction was received from the processing pipeline that is coupled to the particular synchronization strobe counter 270. Each synchronization strobe counter 270 may be incremented and/or decremented during each clock cycle. When a synchronization strobe counter 270 is incremented and decremented in the same clock cycle, the counter value of the synchronization strobe counter 270 is unchanged. Synchronization strobe counters 270 are incremented once for each clock cycle that increment 282 is asserted. Increment 282 is provided to all synchronization strobe counters 270 in parallel by synchronization control unit 280, as described in conjunction with FIG. 3B.

Figure 3B:
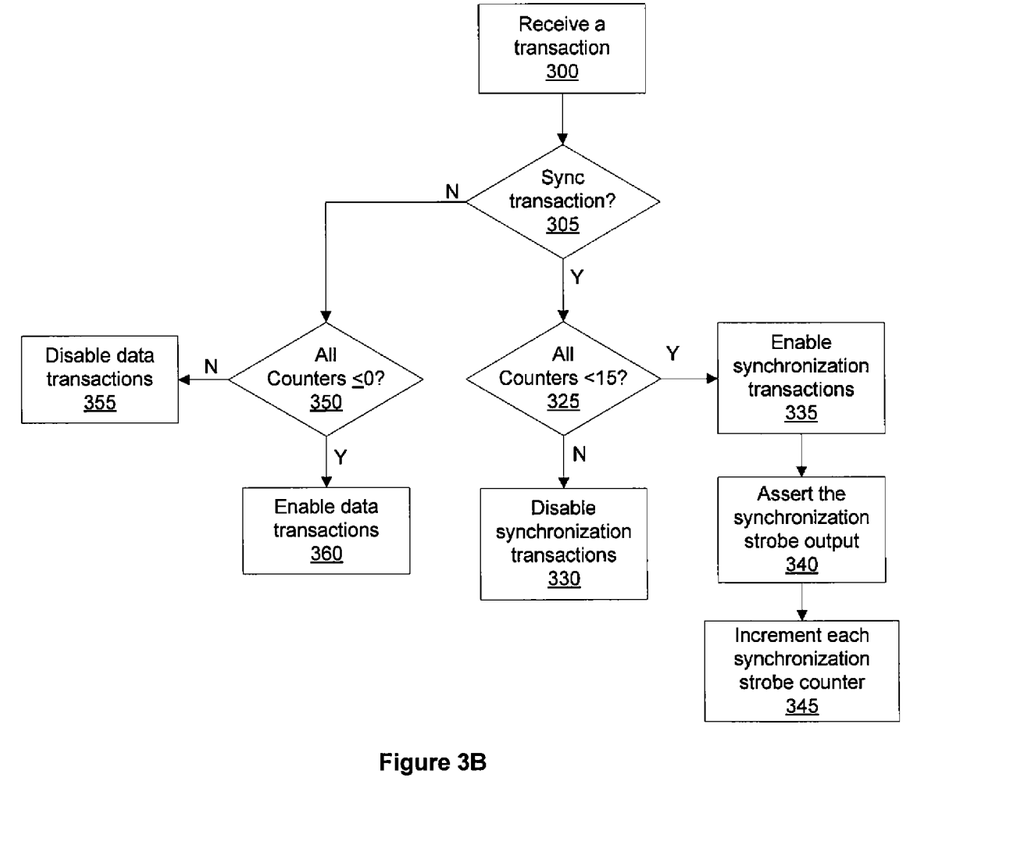
FIG. 3B illustrates a method for performing synchronization between multiple pipelines in accordance with one or more aspects of the present invention.

FIG. 3B illustrates a method for performing synchronization between multiple processing pipelines 210, 220, and 230, in accordance with one or more aspects of the present invention. In step 300 synchronization control unit 280 receives a transaction from pipeline engines 290 via synch transaction 292 or data transaction 293. Whenever a transaction is received, synchronization control unit 280 follows the method steps shown in FIG. 3B, starting with step 300. In step 305 synchronization control unit 280 determines if the transaction is a synchronization transaction. If the transaction is a synchronization transaction, then in step 325 synchronization control unit 280 determines if all of the counters provided to synchronization control unit 280 by each synchronization strobe counter 270 are less than a maximum count of 15. In other embodiments of the present invention, the maximum count may be a different value that is greater or less than 15. Disabling processing of a synchronization transaction when a synchronization strobe counter 270 reaches the maximum count is necessary to prevent the synchronization strobe counter 270 from overflowing. If, in step 325 synchronization control unit 280 determines that one or more of the counters is not less than the maximum count, then in step 330 synchronization control unit 280 disables pipeline engines 290, via output enable/disable 294, from outputting synchronization transactions. Pipeline engines 290 will resubmit the synchronization transaction via synch transaction 292 when output of the synchronization transactions is disabled, waiting until synchronization transactions are enabled.

If, in step 325 synchronization control unit 280 determines that all of the counters are less than the maximum count, then in step 335 synchronization control unit 280 enables pipeline engines 290, via output enable/disable 294, to output synchronization transactions. In step 340 synchronization control unit 280 outputs a synchronization strobe via strobe output 285 to indicate that a synchronization transaction has been received. In step 345 synchronization control unit 280 simultaneously increments each one of synchronization strobe counters 270 via increment 282. Incrementing all of the synchronization strobe counters 270 within processing pipeline 230 indicates the number of synchronization transactions that processing pipeline 230 has processed relative to each processing pipeline, e.g., processing pipeline 210, 220, and 230.

If, in step 305 synchronization control unit 280 determines that the transaction is not a synchronization transaction, then the transaction is a data transaction and in step 350 synchronization control unit 280 determines if all of the counters provided to synchronization control unit 280 by each synchronization strobe counter 270 are less than or equal to zero. If any counter is greater than zero, then in step 355 synchronization control unit 280 disables pipeline engines 290, via output enable/disable 294, from outputting data transactions. When the counters are not all less than or equal to zero a synchronization transaction is pending and data transactions should not be output from any of processing pipeline 210, 220, or 230 until processing pipelines 210, 220, and 230 have all reached a common synch point. Pipeline engines 290 will resubmit the data transaction via data transaction 293 when output of the data transactions is disabled, waiting until data transactions are enabled.

If the counters are all less than or equal to zero in step 350, then in step 360 synchronization control unit 280 enables pipeline engines 290, via output enable/disable 294, to output all data transactions. The present invention allows each processing pipeline 210, 220, and 230 to independently determine that a synch point has been reached, so that a sequence of synchronization transactions can be processed at a rate of one per clock. Notably, all of the processing pipelines 210, 220, and 230 are equal, i.e., there is no master-slave relationship for the processing pipelines or transaction streams 100, 120, and 130. The synchronization latency is only incurred once for each sequence of synchronization transactions and the synchronization mechanism is tolerant of synchronization strobe latency. Therefore, chip-level timing constraints can be met without requiring a redesign of the synchronization mechanism.

Figure 4:
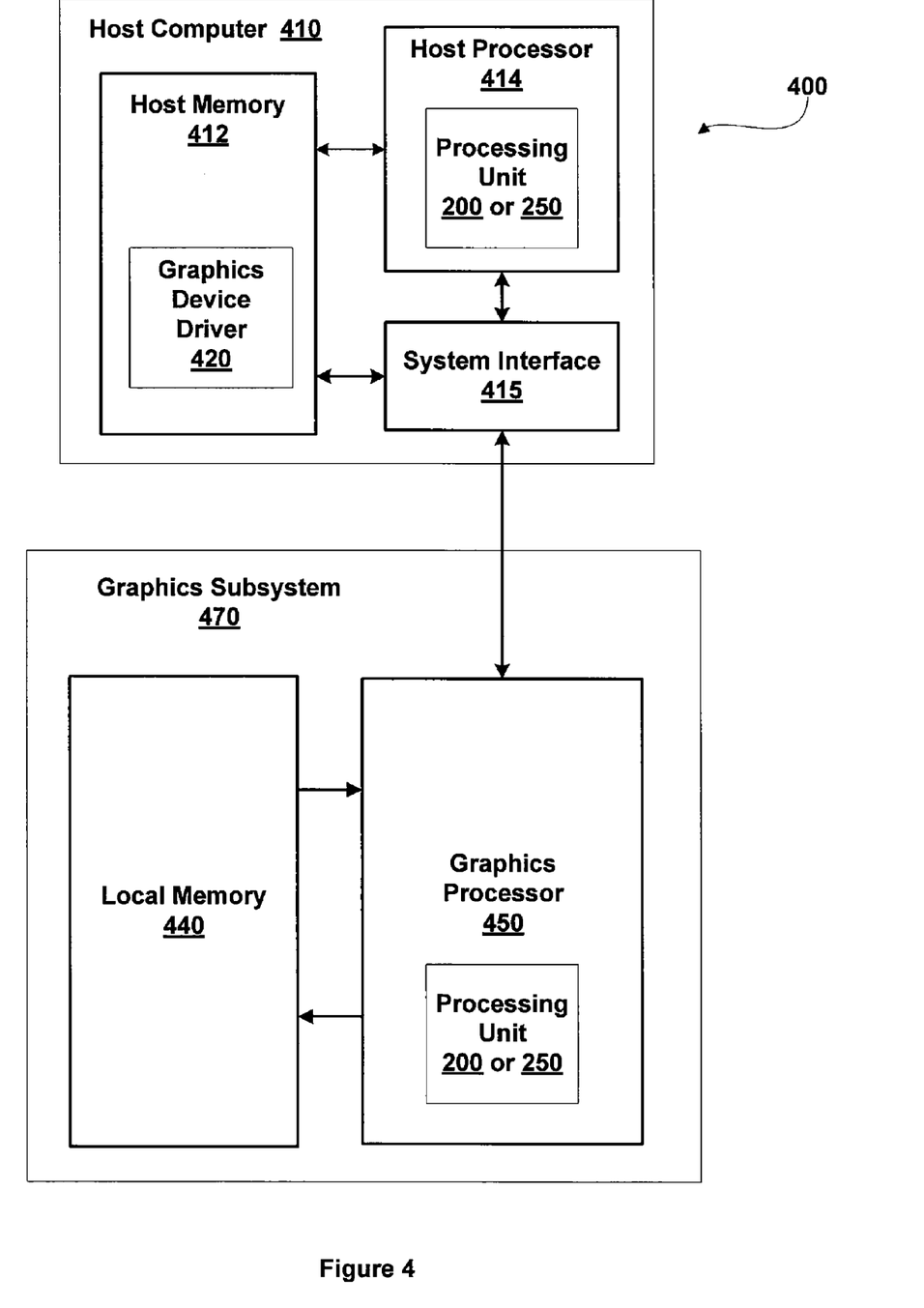
FIG. 4 illustrates a computing system including a host computer and a graphics subsystem in accordance with one or more aspects of the present invention.

FIG. 4 illustrates a computing system 400 including a host computer 410 and a graphics subsystem 470, in accordance with one or more aspects of the present invention. Computing system 400 may be a desktop computer, server, laptop computer, palm-sized computer, tablet computer, game console, cellular telephone, computer based simulator, or the like. Host computer 410 includes host processor 414 that may include a system memory controller to interface directly to host memory 412 or may communicate with host memory 412 through a system interface 415. System interface 415 may be an I/O (input/output) interface or a bridge device including the system memory controller to interface directly to host memory 412.

Host processor 414 includes a processing unit 200 or 250 that may be configured to process multiple transaction streams in parallel using the distributed synchronization mechanism described in conjunction with FIGS. 2C, 3A, and 3B. In some embodiments of the present invention, host processor 414 includes more than one processing pipeline 230.

A graphics device driver 420 is stored in host memory 412 and is configured to interface between applications and a graphics subsystem 470. Graphics device driver 420 translates instructions for execution by graphics processor 450 based on the specific capabilities of graphics processor 450.

Host computer 410 communicates with graphics subsystem 470 via system interface 415. Data received by graphics processor 450 can be processed by a graphics pipeline, such as processing unit 200 or 250, within graphics processor 450 or written to a local memory 440. Graphics processor 450 uses graphics memory to store graphics data and program instructions, where graphics data is any data that is input to or output from units within graphics processor 450. Graphics memory can include portions of host memory 412, local memory 440, register files coupled to the components within graphics processor 450, and the like. Graphics processor 450 includes one or more processing units that may each read and/or write graphics memory. In alternate embodiments, host processor 414, graphics processor 450, system interface 415, or any combination thereof, may be integrated into a single processing unit. Further, the functionality of graphics processor 450 may be included in a chip set or in some other type of special purpose processing unit or co-processor.

In a typical implementation graphics processor 450 performs geometry computations, rasterization, pixel texture mapping and shading computations and raster operations. In some embodiments of the present invention, graphics processor 450 is optionally configured to deliver data to a display device, network, electronic control system, other computing system 400, other graphics subsystem 470, or the like. Alternatively, data is output to a film recording device or written to a peripheral device, e.g., disk drive, tape, compact disk, or the like.

Execution of transaction streams executed by processing units 200 and 250 may be synchronized to ensure that each portion of the data is processed using the state configuration that corresponds to that portion of the data. The synchronization mechanism may be used for multiple synchronizations in a sequence and when the synchronization strobes are pipelined to meet chip-level timing requirements. The synchronization is distributed within each processing pipeline 210, 220, and 230, rather than using a centralized synchronization mechanism. Although present invention has been described in the context of synchronizing state transactions, in other embodiments, the present invention may be employed to synchronize execution of multiple transaction streams containing other synchronization events known to those skilled in the art, e.g., semaphores, mutual-exclusion tokens, and the like. Persons skilled in the art will appreciate that any system configured to perform the method steps of FIGS. 3A and 3B, or their equivalents, are within the scope of the present invention.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computing system for synchronizing multiple transaction streams, comprising:
a first pipeline configured to output a first one of the multiple transaction streams;
a first synchronization control unit coupled to the first pipeline and configured to enable and disable output of the first one of the multiple transaction streams based on synchronization state maintained for the multiple transaction streams;
a first synchronization strobe counter coupled to the first synchronization control unit and configured to maintain a first portion of the synchronization state for the first one of the multiple transaction streams indicating a number of synchronization transactions that the first pipeline has processed relative to other pipelines, each of which is configured to output a respective one of the multiple transaction streams; and
a second synchronization strobe counter coupled to the first synchronization control unit and configured to maintain a second portion of the synchronization state for a second one of the multiple transaction streams.

2. The computing system of claim 1, further comprising:
a second pipeline configured to output the second one of the multiple transaction streams; and
a second synchronization control unit coupled to the second synchronization strobe counter and the second pipeline and configured to output a synchronization strobe to the second synchronization strobe counter when a synchronization transaction in the second one of the multiple transaction streams is output by the second pipeline.

3. The computing system of claim 2, wherein the second synchronization strobe counter is further configured to update indicating that a synchronization transaction of the second one of the multiple transaction streams has been output by the second pipeline when the synchronization strobe corresponding to the second transaction stream is received from the second synchronization control unit.

4. The computing system of claim 2, further comprising one or more retiming registers coupled between the second synchronization control unit and the second synchronization strobe counter and configured to pipeline the synchronization strobe.

5. The computing system of claim 1, wherein each one of the multiple transaction streams includes a common set of state configuration to control processing of data that is distributed between the multiple transaction streams.

6. The computing system of claim 1, wherein the first synchronization control unit is further configured to enable output of data transactions in the first transaction stream when the synchronization state indicates that the first transaction stream and the second transaction stream have both reached a synchronization point that is common to the first transaction stream and the second transaction stream.

7. The computing system of claim 1, wherein the number of synchronization transactions that the first pipeline has processed relative to other pipelines is positive when the first pipeline is ahead of the other pipelines that are each configured to output a respective one of the multiple transaction streams and the number of synchronization transactions that the first pipeline has processed relative to other pipelines is negative when the first pipeline is behind the other pipelines that are each configured to output a respective one of the multiple transaction streams.

8. The computing system of claim 1, wherein a configuration instruction included in the first one of the multiple transaction streams is considered a synchronization event.

9. The computing system of claim 1, wherein a last configuration instruction included in a sequence of configuration instructions in the first one of the multiple transaction streams is considered a synchronization event.

10. The computing system of claim 1, wherein a first configuration instruction included in a sequence of configuration instructions in the first one of the multiple transaction streams is considered a synchronization event.

11. The computing system of claim 1, wherein state configuration included in each one of the multiple transaction streams is tailored specifically for each one of the multiple transaction streams.

12. A computing system for synchronizing multiple transaction streams, comprising:
a first pipeline configured to output a first one of the multiple transaction streams;
a first synchronization control unit coupled to the first pipeline and configured to enable and disable output of the first one of the multiple transaction streams based on synchronization state maintained for the multiple transaction streams;

a first synchronization strobe counter coupled to the first synchronization control unit and configured to maintain a first portion of the synchronization state for the first one of the multiple transaction streams; and a second synchronization strobe counter coupled to the first synchronization control unit and configured to maintain a second portion of the synchronization state for a second one of the multiple transaction streams, wherein the first synchronization strobe counter and the second synchronization strobe counter are each further configured to update when a synchronization transaction for the first transaction stream is output by the first pipeline.

13. A computing system for synchronizing multiple transaction streams, comprising:

a first pipeline configured to output a first one of the multiple transaction streams;

a first synchronization control unit coupled to the first pipeline and configured to enable and disable output of the first one of the multiple transaction streams based on synchronization state maintained for the multiple transaction streams, wherein the synchronization state for the multiple transaction streams indicates counts of pending synchronization points that have been reached by the first one of the multiple transaction streams relative to each one of the multiple transaction streams;

a first synchronization strobe counter coupled to the first synchronization control unit and configured to maintain a first portion of the synchronization state for the first one of the multiple transaction streams; and a second synchronization strobe counter coupled to the first synchronization control unit and configured to maintain a second portion of the synchronization state for a second one of the multiple transaction streams.

14. The computing system of claim 13, wherein the first synchronization strobe control unit is further configured to disable output of synchronization transactions in the first one of the multiple transaction streams when any one of the counts is not less than a maximum count.

15. The computing system of claim 14, wherein the maximum count is greater than a worst-case propagation latency of a synchronization strobe that is output by the first synchronization control unit to another processing pipeline executing one of the multiple transaction streams or that is received by the first synchronization control unit from another processing pipeline executing one of the multiple transaction streams.

\* \* \* \* \*